United States Patent
Pramler

(10) Patent No.: US 6,428,039 B1
(45) Date of Patent: Aug. 6, 2002

(54) SAFETY ARRANGEMENT IN A MOTOR VEHICLE

(75) Inventor: Anders Pramler, Lammhult (SE)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 09/600,126

(22) PCT Filed: Dec. 8, 1998

(86) PCT No.: PCT/SE98/02236

§ 371 (c)(1),
(2), (4) Date: Aug. 30, 1998

(87) PCT Pub. No.: WO99/35012

PCT Pub. Date: Jul. 15, 1999

(30) Foreign Application Priority Data

Jan. 12, 1998 (GB) .............................................. 9800566

(51) Int. Cl.⁷ ............................................. B60R 21/32
(52) U.S. Cl. ........................ 280/735; 180/273; 180/271
(58) Field of Search ................................ 280/735, 734; 180/271, 273

(56) References Cited

U.S. PATENT DOCUMENTS

| | | | |
|---|---|---|---|
| 5,232,243 A | | 8/1993 | Blackburn et al. .......... 280/732 |
| 5,474,327 A | * | 12/1995 | Schousek ................... 280/735 |
| 5,573,269 A | * | 11/1996 | Gentry et al. ............... 280/735 |
| 6,039,344 A | * | 3/2000 | Mehney et al. ............. 280/735 |
| 6,069,325 A | * | 5/2000 | Aoki .......................... 280/735 |
| 6,070,115 A | * | 5/2000 | Oestreicher et al. ........ 280/735 |
| 6,092,838 A | * | 7/2000 | Walker ....................... 280/735 |
| 6,161,891 A | * | 12/2000 | Blakesley ................... 280/735 |
| 6,231,076 B1 | * | 5/2001 | Blakesley et al. .......... 280/735 |
| 6,250,671 B1 | * | 6/2001 | Osmer et al. ............... 280/735 |

FOREIGN PATENT DOCUMENTS

| | | |
|---|---|---|
| DE | 38 09 074 | 10/1989 |
| DE | 197 09 197 | 10/1997 |
| EP | 0 796 768 | 9/1998 |
| WO | WO 98/22920 | 5/1998 |

* cited by examiner

*Primary Examiner*—Jack Lavinder
*Assistant Examiner*—Mariano Sy
(74) *Attorney, Agent, or Firm*—Venable; Robert Kinberg

(57) ABSTRACT

A safety arrangement in a motor vehicle comprises a seat to be occupied by a passenger of the vehicle. The seat is supported by a framework (32, 33). The framework is mounted on to a carriage (6) by four deformable members (5) each having sensor means responsive to deformation of the deformable members. The sensor can determine the weight of a person sitting on the seat and also the position of that person within the seat. The sensors are associated with controls adapted to initiate and control the inflation of an air-bag when an accident arises. The inflation characteristic of the air-bag can therefore be adapted to the weight and position of the occupant of the seat.

5 Claims, 4 Drawing Sheets

SAFETY ARRANGEMENT IN A MOTOR VEHICLE

BACKGROUND OF THE INVENTION

THE PRESENT INVENTION relates to a safety arrangement in a motor vehicle.

It has been proposed to provide safety arrangements in a motor vehicle which incorporate an air-bag adapted to be inflated in the event that an accident should occur to provide protection for the driver or an occupant of a vehicle. It has been customary to mount an air-bag intended to provide protection for a front seat passenger of a motor vehicle in the event that a frontal impact should occur within the dashboard of the motor vehicle. The air-bag is associated with an appropriate sensor arrangement which initiates inflation of the air-bag in the event that a frontal impact should occur.

When the air-bag is inflated, the fabric of the air-bag may be given, at least initially, a very substantial velocity directed towards the occupant of the front seat. If the occupant of the front seat is not in an appropriate position, that is to say, is not sitting fully back in the seat, then difficulties may arise. If, for example, the occupant of the seat is leaning forwardly at the instant that the air-bag is inflated, the air-bag may impact severely with the occupant of the seat and may impart substantial injuries to the occupant of the seat.

If the occupant of the front seat is very heavy, then the occupant of the seat will require much more "cushioning" in the event that a frontal impact should arise than a very light occupant of the seat. Thus, it is desirable to be able to inflate an air-bag which has been provided to protect the occupant of a front seat in the event of a frontal impact, in dependence upon the weight of the occupant of the seat.

It has been proposed before to control the inflation of an air-bag provided to protect a front seat passenger in a motor vehicle. DE OS 2516185 discloses an arrangement in which a switch is provided within the squab of the seat. If the occupant is sitting on the seat, the switch is closed, and in the event that an accident should occur, the air-bag is fully inflated. However, if the switch is not closed, which is a situation which might obtain if the occupant of the seat is not actually sitting on the seat, but instead is standing in front of the seat, then the air-bag is only partially inflated.

DE 3809074 also discloses an arrangement in which sensors are located between the squab of the seat and the floor of the motor vehicle to determine the downward forces applied at the front and at the rear of the seat, to determine the position of the occupant of the seat and thus to control the inflation characteristic of an air-bag.

Sensors that have been utilised previously have been designed to resist the forces which may be applied to the sensors in an accident situation. These forces can be extremely high. It has proved to be extremely difficult to provide a sensor which has sufficient strength, but which can provide a reliable and accurate determination of the forces applied to the seat during ordinary driving conditions. Many of the sensors that have been used before are such that the measurement of the force is determined as a consequence of a movement of one part of the sensor relative to another part of the sensor. Any frictional effects between the two parts of the sensor causes the sensor to provide an incorrect reading and also, if the occupant of a seat changes position there may be a substantial time delay (at least relative to the time available to inflate an air-bag during an accident situation, which is usually measured as a few tens of milliseconds) before a correct output signal is provided.

BRIEF SUMMARY OF THE INVENTION

The present invention seeks to provide an improved safety arrangement.

According to this invention there is provided a safety arrangement in a motor vehicle, the safety arrangement comprising a seat to be occupied by a passenger of the vehicle, a plurality of sensors located between the seat and the floor of the vehicle, each adapted to provide an indication of the downward force applied to it, control means adapted to initiate and control the inflation of an air-bag and adapted to receive signals from the sensors, and adapted to control the inflation of the air-bag in dependence upon the nature of the said signals, the sensors comprising means which, at least in ordinary use of the seat, form the sole connection between the seat and the floor of the motor vehicle, each sensor comprising a first portion connected directly or indirectly to the floor of the motor vehicle, and a second portion connected directly or indirectly to the seat, said two portions being inter-connected by a deformable element having sensor means responsive to deformation thereof.

Preferably the first portion of each sensor is mounted on a carriage slideable along a rail mounted on the floor of a motor vehicle and the second portion of each sensor is connected to a sub-frame of the seat.

Conveniently the element inter-connecting the first and second portions of each sensor comprises a cantilever beam adapted to deflect when a downward force is applied to the portion connected to the seat.

In one embodiment the cantilever element has one end connected to a mounting block comprising said first portion, the mounting block having means securing the mounting block to part of the carriage, and has the other end connected to a mounting block, that other mounting block having means securing the mounting block to part of a sub-frame for the seat.

In an alternative embodiment each sensor comprises an integral element, the element having a first portion mounted to a carriage slidably mountable in a rail connected to the floor of the vehicle and a second portion connected to the sub-frame of a seat, the two portions being inter-connected by a cantilever element.

Preferably part of the carriage is located adjacent part of the sub-frame, one of said parts carrying a projection of a predetermined diameter, said projection being located within an aperture of slightly greater diameter formed in the other part, the arrangement being such that in the event that a substantial force is applied to the seat, the projection carried by the one part will engage the wall of the aperture carried by the other part.

Conveniently the said one part comprises a web carried by the carriage, and the other part comprises a flange carried by a support element forming part of the sub-frame, the carriage carrying a bolt having a threaded portion passing through a bore provided in the web and having a portion of enlarged diameter, defining a shoulder with the threaded portion, the portion of enlarged diameter extending through said aperture which is formed in a flange provided on a support element forming pail of the sub-frame of the seat.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
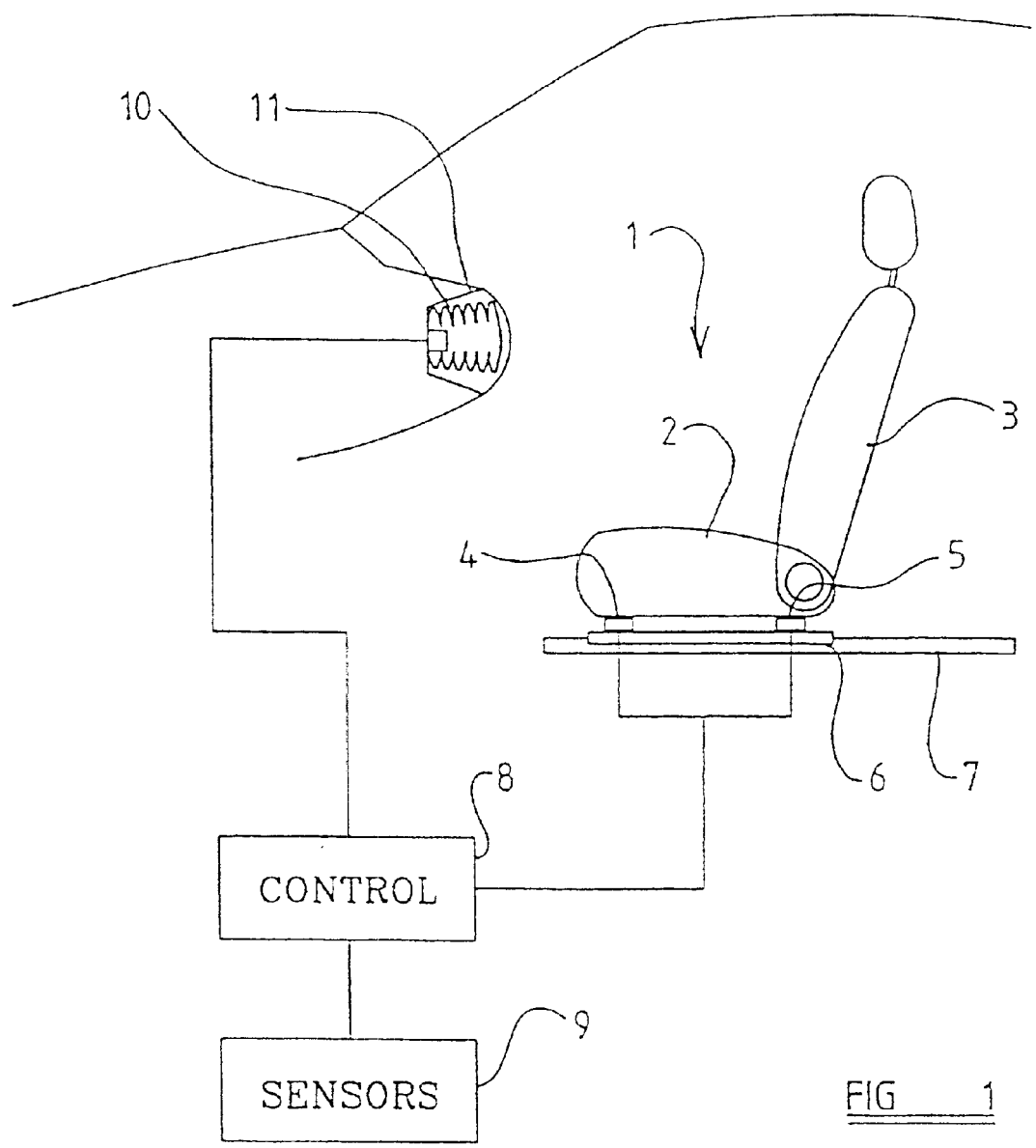
FIG. 1 is a schematic illustration, which comprises a partial block diagram, illustrating a vehicle seat for a front seat passenger in a motor vehicle, and an associated air-bag, together with a control arrangement.

Referring initially to FIG. 1 of the accompanying drawings, a vehicle seat 1 is illustrated having a squab 2 and a back 3. The squab 2 is connected by means of four sensors, (only two of which 4, 5, are visible in FIG. 1) to two carriages, (only one of which, 6, is visible in FIG. 1), which are mounted on a pair of rails (only one of which, 7, is visible in FIG. 1) which are mounted on the floor of a motor vehicle. The seat is provided with two sensors 4, 5, along each side of the seat, one sensor 4 being located at the front of the seat, and one sensor 5, being located at the rear of the seat.

The sensors 4, 5 are connected to a control arrangement 8 which also receives signals from further sensors 9 which are responsive to an accident or a situation when an accident is likely to occur. Thus, the sensors 9 may comprise acceleration sensors or impact sensors.

The control device 8 is connected to an air-bag arrangement 10 mounted in the dashboard 11 in front of the seat 1. The control arrangement 8 can initiate inflation of the air-bag 10. The control arrangement 8 can also control the manner in which the air-bag is inflated. For example, the air-bag may be provided with two pyrotechnic gas generating charges. The control arrangement may activate either one of the charges, or the other of the charges, or both of the charges, thus providing three degrees of inflation of the air-bag. Alternatively the control arrangement may, in certain circumstances, activate neither of the charges and the air-bag will remain uninflated. The control arrangement 8 can, of course, also control the instant at which inflation of the air-bag is commenced.

Figure 2:
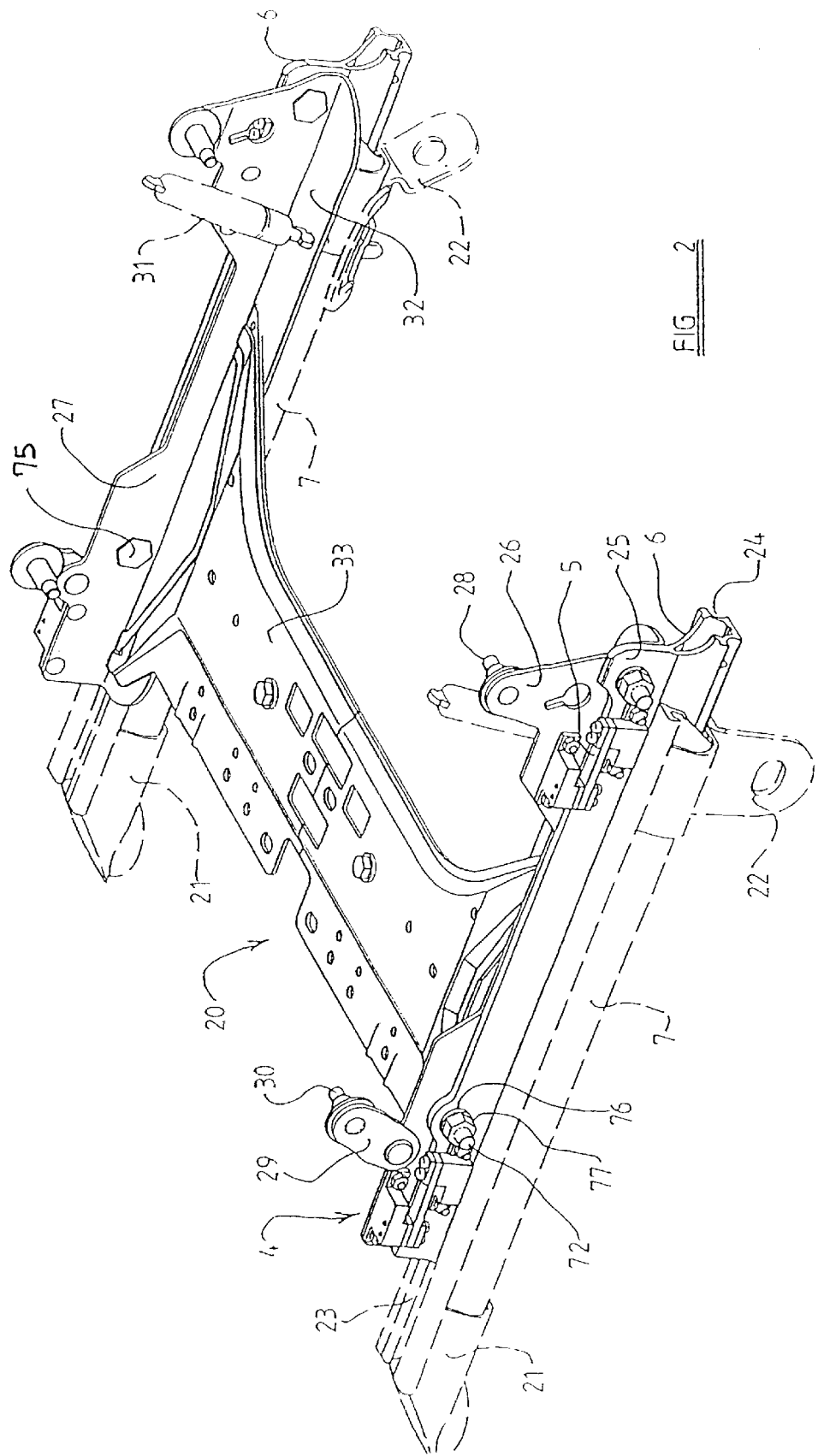
FIG. 2 is a perspective view of the sub-frame for the seat as shown in FIG. 1, and associated carriages on which the sub-frame is mounted for movement along rails (which are shown in phantom)

Referring to FIG. 2, the squab 2 of the seat 1 is mounted on a sub-frame 20 which is illustrated in FIG. 2. The sub-frame 20 is mounted on the carriages 6 which are mounted for axial sliding movement on the rails 7. The sub-frame, the carriages and the rails are substantially symmetrical about the mid-point of the sub-frame.

In FIG. 2, the rails 7 are shown in phantom. Each rail is provided, at its forward end, with a clip 21 by means of which the forward end of the rail is secured to the floor of the motor vehicle. The rear part of each rail, as illustrated, is also provided with a clip 22 by means of which the rail is secured to the floor of the vehicle. Each rail 7 comprises an elongate extrusion defining a channel having an elongate open top 23.

Each carriage 6 comprises a lower portion 24 adapted to be received within the channel defined by the rail. Appropriate ball bearings or other roller elements are located between the portion 24 of the carriage 6 which is received within the channel, and the channel itself to facilitate axial movement of the carriage along the rail.

The carriage 6 incorporates an up-standing web 25 which extends vertically upwardly through the open top 23 of the channel. Connected to the web 25 are the sensors 4, 5, which act to support an elongate "L"-shaped support element 26 which forms part of the sub-frame 20. The support element 26 comprises a vertical flange 27, which is in alignment with and substantially adjacent the web 25 of the rail 6. The vertical flange 27 supports, towards the rear of the seat, a horizontally extending pivot 28 and, towards the front of the seat, an upstanding movable link 29 which supports, at its upper end, a horizontally extending pivot 30. The squab 2 of the seat may be mounted on the pivots 28, 30 and movement of the squab relative to the sub-frame may be controlled by a pair of gas springs 31 (shown in phantom) connected between the horizontally extending flange 32 of the support element 26 and the squab of the seat. The horizontally extending flange 32 also supports a plate 33 which extends transversely towards the other carriage. Two plates 33 are connected together to provide a rigid sub-frame.

It is to be appreciated, at this stage, that the sub-frame, which comprises the support elements 26 and the plates 33, supports the squab of the seat, and the sub-frame itself is supported on the carriages by means of the sensors 4 and 5. The sensors 4 and 5 thus form the sole connection between the sub-frame and the carriages.

Figure 3:
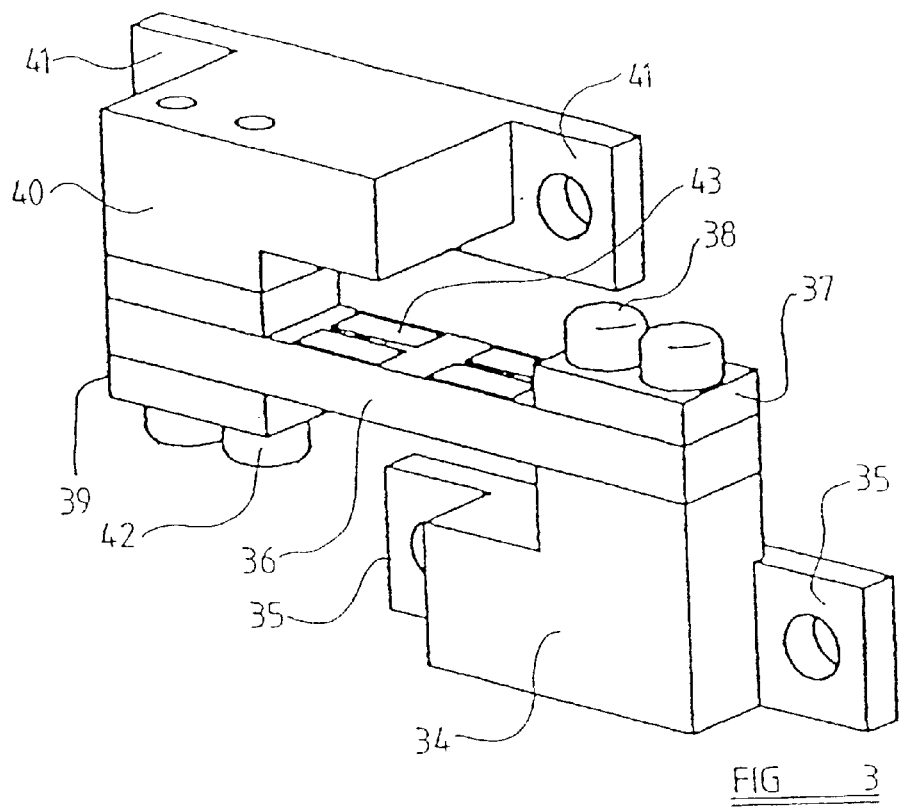
FIG. 3 is an enlarged view of a load cell forming a mounting element as shown in FIG. 2.

The sensors 4 and 5 are of the same design, and the sensor 4 is illustrated in FIG. 3. The sensor 4 comprises a lower mounting block 34 provided with two oppositely outwardly apertured lugs 35 by means of which the mounting block may be secured to the upstanding web 25 provided on the carriage 6. The mounting block 34 presents a planar upper surface, and one end of a cantilever beam 36 rests upon that upper surface. Above that one end of the cantilever beam 36 is a keeper plate 37, and two bolts 38 are provided which extend through the keeper plate 37, through the end of the cantilever beam 36 and into appropriate threaded bores provided in the mounting block 34.

The cantilever beam 36 extends substantially parallel with the axis of the rail 7. The other end of the cantilever beam is sandwiched between a keeper plate 39 located beneath the end of the beam, and a horizontal face which forms the lower-most face of a mounting block 40. The mounting block 40 is provided with two oppositely and outwardly directed apertured lugs 41 by means of which the upper mounting block 40 may be mounted to the vertical flange 27 of the support element 26. A pair of bolts 42 are provided which extend upwardly through the keeper plate 39, through the end of the cantilever beam 36 and into the mounting block 40.

It will thus be understood that the entire sub-frame 20, and the seat supported by the sub-frame 20, is supported from the carriage by means of four cantilever beams 36. The cantilever beams 36 are provided with sensors 43 provided on the surface of the cantilever beams 36 which are responsive to distortion or deformation of the cantilever beams 36. The sensors may, for example, comprise resistive material, the resistance of which is dependent upon the tensile forces applied to the material. The sensors may comprise piezo electric material which provide a potential in dependence upon the stress or pressure applied to the piezo electric material. The cantilever beam 36 thus forms a load cell.

Figure 4:
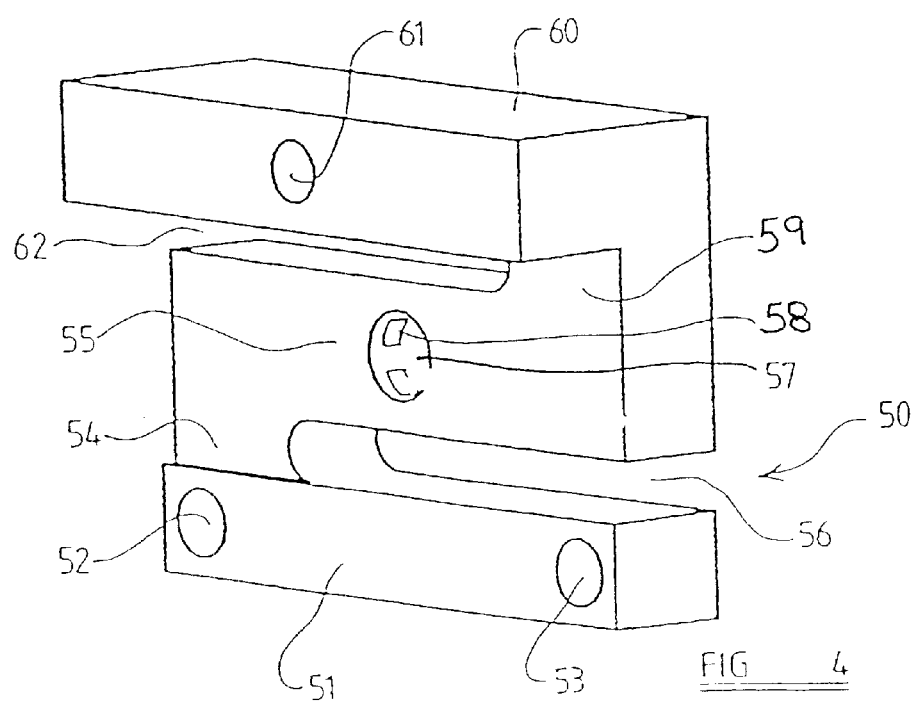
FIG. 4 is an enlarged view of an alternative form of load cell.

FIG. 4 illustrates a modified sensor where the mounting blocks and the cantilever element are all formed integrally.

Thus, referring to FIG. 4, an alternative sensor comprises an integral component 50 comprising a first substantially rectangular mounting block 51 having a substantial horizontal extent, the block 51 being provided with horizontal bores 52, 53 at the opposed ends thereof by means of which the block 51 may be secured to the upstanding web 25 provided on the carriage 6. At one end of the mounting block 51 there is provided an upwardly directed extension 54 having a width which is substantially less than the length of the block 51, the extension 54 merging into a second substantially horizontally extending cantilever block 55 which lies over the first block 51. A substantial part of the cantilever block 55 is spaced from the block 51 by means of a gap 56. A centrally located horizontal bore 57 extends through the cantilever block 55. Sensor elements 58 are mounted on the side wall of the bore 57 of the cantilever block 55. The sensor elements 58 may be of the same type as described with reference to FIG. 3. The end of the cantilever block 55, which is remote from the upwardly directed extension 54, is itself provided with a second upstanding extension 59 which serves to connect that end of the cantilever block 55 to an upper-most horizontally extending mounting block 60. The mounting block 60 is provided with a horizontal bore 61 by means of which the block 60 may be bolted to the vertical flange 27 of the support element 26. There is a gap 62 between the mounting block 60 and the cantilever block 55.

It will be appreciated that the central cantilever block 55 with the sensors 58 performs an equivalent function to the cantilever element 36 and the sensor elements 43 of the embodiment described with reference to FIG. 3.

Figure 5:
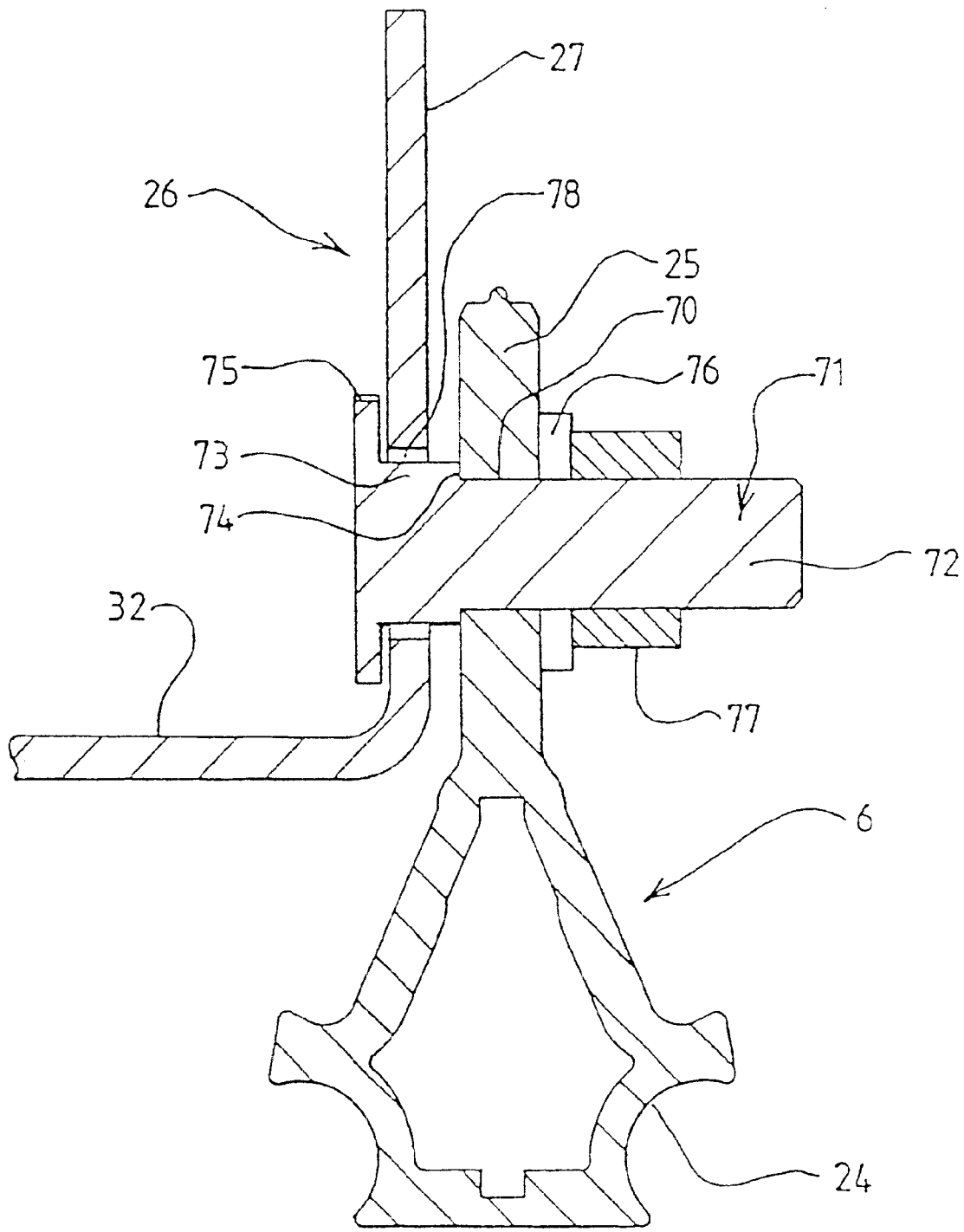
FIG. 5 is an enlarged sectional view illustrating a bolt arrangement securing the sub-frame of FIG. 2 to the carriage of FIG. 2.

Turning now to FIG. 5 of the accompanying drawings, part of the carriage 6 is shown in cross-section, and the lower part 24 of the carriage is shown as part of a hollow extrusion supporting the web 25. Located adjacent the web 25 is the upstanding flange 27 of the support element 26.

A bore 70 is provided in the web 25 provided on the carriage 6. A bolt 71 extends through the bore 70. The bolt 71 is provided with a threaded portion 72 of a diameter which is slightly smaller than the diameter of the bore 70, and this portion of the bolt passes through the bore 70. The threaded portion 72 is connected to a non-threaded portion 73 of slightly greater diameter than the bore 70, there thus being a discrete shoulder 74 between the threaded portion 72 and the non-threaded enlarged diameter cylindrical portion 73. The shoulder 74 abuts one side face of the web 25 adjacent the bore 70. The non-threaded cylindrical portion 73 carries an enlarged hexagonal head 75. There is a clearance gap between the head 75 and the web 25 of the carriage 6.

The threaded portion 72 carries a washer 76 which abuts against the other face of the web 25 and a nut 77 which holds the washer in place.

The cylindrical portion 73 of the bolt of enlarged diameter extends through an aperture 78 formed in the vertical flange 27 of the support element 26. The aperture 78 is of greater diameter than that of the cylindrical portion 73.

A bolt arrangement as illustrated in FIG. 5 is provided, as can be seen in FIG. 2, adjacent each sensor 4 and 5.

When the seat is in use, with a person sitting on the seat, a downward force will be applied to each of the sensors 4 and 5, causing the cantilever element of each sensor to bend. The degree of bending is dependent upon the downward force applied to the sensor. The degree of bending, and thus the downward force, applied to each sensor can readily be determined and, by comparing the forces applied to the sensors 4 provided at the front of the seat, and the sensors 5 provided at the rear of the seat, it is possible to determine the position of the centre of gravity of the occupant of the seat. It is possible to determine if the centre of gravity is located in a position equivalent to that of a person sitting fully back in the seat, or equivalent to that of a person leaning forwardly in the seat. Also, by determining the total sum of the downward forces applied to the four sensors, it is possible to determine the body weight of the occupant of the seat. The appropriate calculations are carried out in the control arrangement 8 which determines the manner in which the air-bag 10 will be inflated in the event that the sensors 9 provide signals indicative of the fact that an accident is likely to happen or an accident is happening.

In the event that an accident does arise, and if very substantial forces are applied to the sub-frame 20 of the seat, if the sensors permit a substantial movement of sub-frame relative to the carriages 6, the cylindrical portions 73 of the bolts 71 of enlarged diameter will engage the apertures 78, thus preventing the sub-frame moving by more than a relatively small predetermined distance, relative to the carriages 6. It is to be appreciated, however, that the spacing between the exterior part of the enlarged diameter cylindrical portions 73 of the bolts 71, and the apertures 78 is such that in ordinary use of the seat, and with persons of ordinary weight sitting upon the seat, the external periphery of the enlarged diameter cylindrical portion 73 of the bolts 71 do not come into contact with the interior of the apertures 78, meaning that the sub-frame is supported solely by the sensors 4 and 5.

What is claimed is:

1. A safety arrangement in a motor vehicle, the safety arrangement comprising a seat to be occupied by a passenger of the vehicle, a plurality of sensors located between the seat and the floor of the vehicle, each adapted to provide an indication of the downward force applied to it, control means adapted to initiate and control the inflation of an air-bag and adapted to receive signals from the sensors, and adapted to control the inflation of the air-bag in dependence upon the nature of the said signals, the sensors comprising means which, at least in ordinary use of the seat, form the sole connection between the seat and the floor of the motor vehicle, each sensor comprising a first portion connected directly or indirectly to the floor of the motor vehicle by being mounted on a carriage slideable along a rail mounted on the floor of the motor vehicle, and a second portion connected directly or indirectly to a sub-frame of the seat, said two portions being inter-connected by a deformable element having sensor means responsive to deformation thereof, wherein part of the carriage is located adjacent part of the sub-frame, one of a) said part of the carriage and b) said part of the sub-frame carrying a projection of a predetermined diameter, said projection being located within an aperture of slightly greater diameter formed in the other part, the arrangement being such that in the event that a substantial force is applied to the seat, the projection carried by the one part will engage the wall of the aperture carried by the other part.

2. A safety arrangement according to claim 1, wherein the deformable element inter-connecting the first and second portions of each sensor comprises a cantilever beam adapted to deflect when a downward force is applied to the portion connected to the seat.

3. A safety arrangement according to claim 2, wherein the cantilever beam has one end connected to a mounting block comprising said first portion, the mounting block having means securing the mounting block to part of the carriage, and has the other end connected to a mounting block, that other mounting block having means securing the mounting block to part of a sub-frame for the seat.

4. A safety arrangement according to claim 2, wherein each sensor comprises an integral element, the integral element having a first portion mounted to a carriage slidably mountable in a rail connected to the floor of the vehicle and a second portion connected to the sub-frame of a seat, the two portions being inter-connected by the cantilever beam.

5. An arrangement according to claim 1, wherein the said one part comprises a web carried by the carriage, and the other part comprises a flange carried by a support element forming part of the sub-frame, the carriage carrying a bolt having a threaded portion passing through a bore provided in the web and having a portion of enlarged diameter, defining a shoulder with the threaded portion, the portion of enlarged diameter extending through said aperture which is formed in a flange provided on a support element forming part of the sub-frame of the seat.

* * * * *